United States Patent

Wells

[15] 3,642,369
[45] Feb. 15, 1972

[54] DOCUMENT RECORDING APPARATUS
[72] Inventor: Charles Don Wells, 136 West Stafford Road, Worthington, Ohio 43085
[22] Filed: Feb. 19, 1969
[21] Appl. No.: 800,915

[52] U.S. Cl. .................................................355/64, 355/65
[51] Int. Cl. .......................................................G03b 27/70
[58] Field of Search ...............................................355/64, 65

[56] References Cited

UNITED STATES PATENTS

| | | | |
|---|---|---|---|
| 2,435,099 | 1/1948 | Pratt et al. | 355/64 |
| 2,487,561 | 11/1949 | Landrock et al. | 355/65 |
| 2,565,074 | 8/1951 | Halahan et al. | 355/65 |

Primary Examiner—Samuel S. Matthews
Assistant Examiner—E. M. Bero
Attorney—Frank H. Foster

[57] ABSTRACT

An apparatus is disclosed for permitting a seated operator to microfilm documents. A structure similar to an office desk has a central aperture in its top in which a transparent exposure plate is mounted and beneath which lighting tubes are mounted. A microfilm camera is mounted in an upper drawer to one side of the knee hole. Mirrors are provided to reflect the image rays toward the rear of the structure, then beside the knee hole, and ultimately to the camera. A hinged removable panel is mounted in the aperture flush with the top surface of the structure. When the panel is removed, the exposure plate moves upwardly to a flush position for receipt of the documents to be recorded.

11 Claims, 6 Drawing Figures

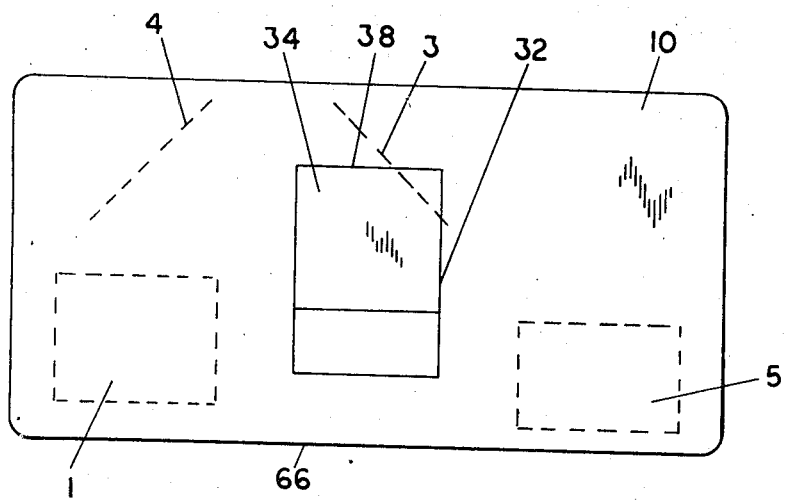
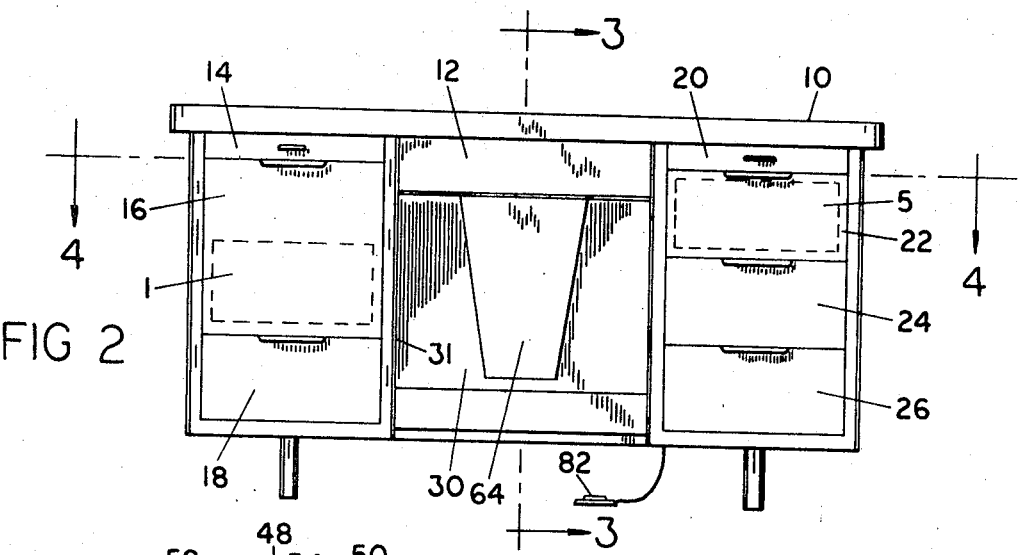
FIG 1
FIG 2
FIG 3
INVENTOR.
CHARLES DON WELLS
BY Frank H Foster
ATTORNEY

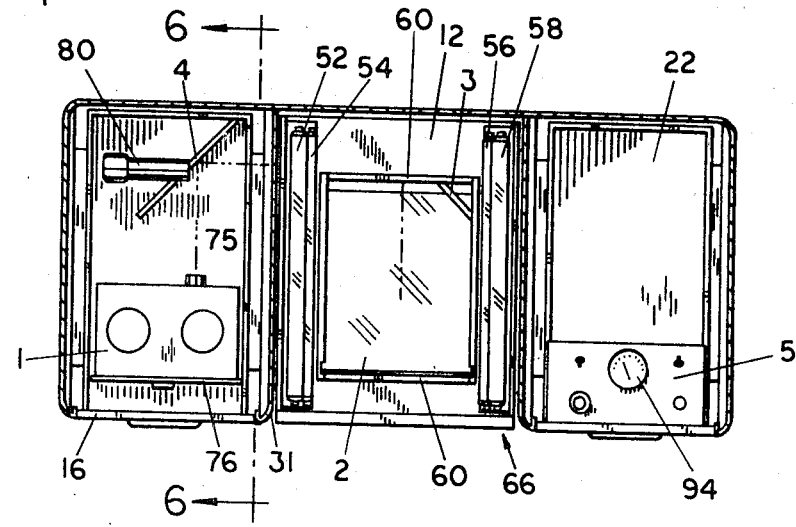
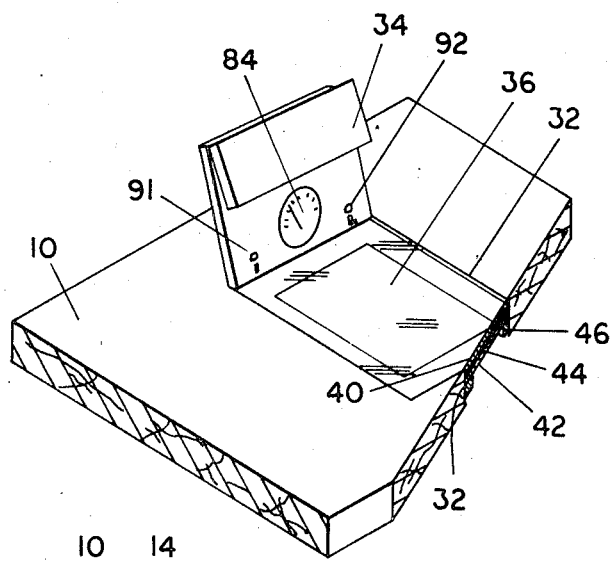
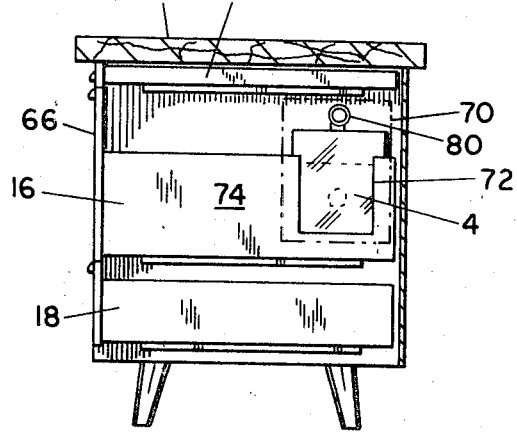

3,642,369

DOCUMENT RECORDING APPARATUS

BACKGROUND

This invention relates to document recording and more particularly relates to the microfilming of public records such as real estate deeds and mortgages.

Microfilm recording has established itself as an efficient manner of recordkeeping. Important records are photographed in small frames on reels of high-resolution photographic film. These can be safely and conveniently stored in cabinets and are viewed in standard microfilm viewers.

Microfilm systems generally require a camera, an illuminating system, and an exposure platform or table on which a document is positioned. The conventional system has such a platform above which the camera is mounted. On either side of the camera and above the platform are mounted two or more floodlights which direct light down onto the platform and the document.

These conventional systems perform satisfactorily if they are operated by well-trained personnel and if they are isolated from other office equipment and personnel. There is a need, however, for a microfilm recording apparatus which can be placed and used alongside other office equipment where it is close to the office workflow. To permit such placement and use, a microfilming system must be rugged and must be protective of the camera and lights. Perhaps more importantly, such a system should be easily and conveniently operated by relatively unskilled personnel.

It is therefore an object of the invention to provide an improved document recording apparatus.

Another object is to provide a microfilming apparatus in which the important components are readily and comfortably accessible to a seated operator.

Another object is to provide a microfilming apparatus in which the delicate components are contained within a protective structure.

Another object is to provide a microfilming apparatus which can be utilized as an ordinary office desk when not being used for recording.

Yet another object is to provide a microfilming apparatus which is simple to operate and can be operated by ordinary office personnel, and therefore will facilitate the recording of documents.

Further objects and features of my invention will be apparent from the following specifications and claims when considered in connection with the accompanying drawings illustrating several embodiments of the invention.

SUMMARY

I have found that the foregoing and other objects can be attained in a document recording apparatus for recording, by a seated operator, of images of documents, the apparatus comprising: (a) a support frame having in a selected position a front and a rear and provided with a void opening to the front for receiving legs of the seated operator; (b) a transparent exposure plate mounted on the frame above the void for positioning of documents thereon; (c) illumination means mounted to the frame below the exposure plate for properly illuminating a document positioned thereon; (d) a camera mounted on the frame to one side of the void; and (e) mirror means mounted to the frame for transmitting the image of the document from the exposure plate along a path, avoiding the legs of the seated operator, to the camera; wherein an operator may, while seated, position documents on the exposure plate and actuate the camera.

DESCRIPTION OF THE VIEWS

FIG. 1 is a plan view of the preferred embodiment of the invention;

FIG. 2 is a front elevation of the preferred embodiment of the invention illustrated in FIG. 1;

FIG. 3 is a vertical section of the embodiment of the invention illustrated in FIG. 1, taken substantially along the line 3—3 of FIG. 2;

FIG. 4 is a horizontal section of the embodiment illustrated in FIG. 1, taken substantially along the line 4—4 of FIG. 2;

FIG. 5 is a removed section in perspective illustrating the exposure plate and removable panel of the preferred embodiment shown in FIG. 1; and FIG. 6 is a vertical section of the embodiment illustrated in FIG. 1, taken substantially along the line 6—6 of FIG. 4.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

The preferred embodiment of the invention is illustrated in FIGS. 1–6, and the following description refers to all of these Figures.

The external appearance of the preferred embodiment is similar to that of a conventional office desk. A horizontal platform 10 forms a top below which a center drawer 12 is slidably mounted. On the left side and below the top 10, a left upper drawer 14, a large left drawer 16, and a bottom left drawer 18 are slidably mounted. On the right side and below the top 10, an upper right drawer 20, a right drawer 22, a right drawer 24, and a bottom right drawer 26 are slidably mounted. A void 30 is formed between the left and the right drawers to provide a knee hole.

One feature of the document recording apparatus of the invention is that when it is not being operated for document recording purposes it can be used for many of the usual office functions. For example, it can serve as a receptionist or clerk's desk, at which various office and clerical functions can be performed. It should be noted, however, that instead of the common type of slidable drawers illustrated in the drawings, other slidable mounting frames would be suitable. In some situations, nonsliding mounting frames could be used to mount various components. Therefore, the term "drawer" is used broadly to refer to a slidable mounting frame and is not limited to common types of drawers.

Briefly, the preferred embodiment has a camera 1 mounted in the large left drawer 16, a document positioning aperture 32 in the center of the top platform 10, and suitable mirror means 2, 3, and 4 for reflecting the image rays from a document at the aperture 32 to the camera 1. Illumination means is provided beneath the aperture 32, and control equipment 5 is mounted in the top right drawer 22.

In more detail, the central portion of the apparatus above the knee hole void 30 is adapted for the accurate and convenient positioning and illumination of a document to be recorded. The top platform 10 has a central rectangular aperture 32. A transparent exposure plate assembly 36 is mounted in the aperture 32 to provide a convenient surface on which the document to be recorded is placed. A panel 34 is removably mounted, also in the aperture 32, above the exposure plate assembly 36. In its closed position, illustrated in FIG. 1 and FIG. 3, the top removable panel 34 is flush with the top of the platform 10. This provides a smooth continuous work space for the conventional office functions.

Although the panel 34 could be constructed to be removed in any of several ways, the panel 34 is preferably hinged to the platform 10 along the rear edge 38 of the panel 34. The panel 34 may then be removed from the aperture 32 by rotating it upwardly to the position illustrated in FIG. 5 to reveal the exposure plate assembly 36 mounted below it. The preferred exposure plate assembly 36 comprises a pair of glass plates 40 and 42 separated by an opaque framing mask 44. These three components rest on an exposure plate frame 46.

Because it is desirable that the top of the exposure plate assembly 36 become flush with the platform 10 after the removable panel 34 is removed, a lifting means is provided for raising the exposure plate assembly 36 to such a flush position by removal of the panel 34. The preferred lifting means comprises a resilient means such as a plurality of leaf springs (leaf springs 48 and 50 being visible in FIG. 3) which are fixed to the underside of the platform 10 near the aperture 32 and which extend to and contact the exposure plate frame 46. These leaf springs are biased to urge the exposure plate assembly 36 upwardly to its desired flush position. Removal of the panel 34 permits the leaf spring to raise the exposure plate assembly 36. Replacement of the panel 34 into the aperture 32 pushes the exposure plate assembly 36 to its position illustrated in FIG. 3. The removable panel 34 may, for convenience, comprise two hinged foldable portions as illustrated and may have control means mounted to it as described below.

Illumination means are mounted beneath and to the sides of the exposure plate assembly 36 for properly illuminating a document which is positioned on the exposure plate with its face down. The preferred illuminating means includes two pairs of parallel light tubes 52, 54, 56, and 58 which are mounted to opposite sides of the center drawer 12. The center drawer 12 is slidable and therefore facilitates replacement of burned-out light tubes.

The bottom of the center drawer 12 has a framed cutout 60 to permit image rays from a document, positioned on the exposure plate assembly 36, to pass vertically downward to a first mirror 2. The first mirror 2 slopes at a 45° angle downwardly toward the rear 62 of the apparatus. It is supported on a similarly sloping metal wall 64 which is a part of a compartment mounted to and below the center drawer 12.

The mirror 2 reflects the images away from the front 66 of the apparatus and to a second mirror 3. The second mirror 3 is vertical, diagonal, and positioned to reflect the image rays toward the side of the knee hole void 30. Thus, the first mirror 2 and the second mirror 3 reflect the image rays along a path which avoids the legs of a seated operator.

The left side panel 31 of the knee hole void 30 has a large opening 70 which is illustrated in phantom in FIG. 6. This opening 70, together with another cutaway 72 in the side 74 of the large left drawer 16, allows the image rays to be reflected from the second mirror 3 to the vertical diagonal third mirror 4 located in the rear of the large left drawer 16. This third mirror 4, like the camera 1, is conveniently to one side of the knee hole void 30 and in turn reflects the image rays to the camera lens 75 of the camera 1.

The camera 1 is preferably mounted in the illustrated position within the drawer 16 near the front thereof so that an operator can, with substantial ease, merely slide the drawer 16 out to provide access to the camera for changing the film reels. For greater convenience, unexposed film reels can be stored in the left lower drawer 18. After replacing a reel in the camera 1, the operator merely slides the drawer 16 closed and continues recording.

The camera 1 itself is preferably slidably mounted in the top left drawer 16. This slidable mounting may be accomplished by fastening the camera 1 to a slidable file drawer divider 76. The camera 1 can be slid longitudinally along the drawer 16 to provide a desired image reduction. This adjustment is very conveniently done because the camera is readily accessible.

As an alternative, if variable image reduction is unnecessary, the camera 1 can be mounted at the rear of the drawer 16 at approximately the position of the third mirror 4 in FIG. 1. The mirror 4 would be eliminated and the camera lens would be directed toward the second mirror 3 from which it would receive the image rays.

A light intensity transducer 80 is mounted in the large left drawer 16 above the third mirror 4. It supplies an electrical analog of the light intensity to the control unit 5 which is preferably conveniently mounted in the top right drawer 22. The control unit 5 controls the camera 1 and illumination means. A foot pedal 82 is electrically connected to the control unit to actuate the camera shutter. For the convenience of the operator, and also connected to the control unit, a light intensity meter 84 and a pair of document face indicators 91 and 92 are mounted to the underside of the removable panel 34. This position makes the indicated information most conveniently viewable by the operator. The document face indicators 91 and 92 are a pair of lights labeled 1 and 2 (or otherwise, as for example "front" and "rear") which are alternately illuminated with each exposure. These indicate to an operator whether a first or a second side of a document has been recorded. The potentiometer or other device for adjusting the light intensity could be mounted to the removable panel 34. In fact, any indicating or operating devices, which are collectively referred to as "control means," could be mounted to the removable panel 34.

In operation, the advantages and features of the invention are most readily apparent. An operator will be seated as at a conventional desk. Her knees would extend into the void 30, and the aperture 32 would be most comfortably located above her lap. The documents to be recorded, for example—deeds, could be stacked on the platform 10 at one side of the aperture 32. The operator would lift the removable panel 34 to the position illustrated in FIG. 5 and slide the top right drawer 22 partly open to expose the control unit 5. The camera 1 and the illumination means are then turned on. The operator can glance at the light intensity meter 84 and a voltmeter 94 to assure that the control unit 5 is properly adjusted to the readings which have been previously prescribed for the type of document being recorded. The control unit 5 can be adjusted if necessary and the top right drawer 22 closed. The documents are then sequentially placed face down on the exposure plate assembly 36 and recorded by actuation of the foot pedal 82. After recording, the documents can be stacked on the opposite side of the aperture 32 until all of the documents have been recorded.

If the reel of film must be replaced, the operator opens the bottom left drawer 18, withdraws the reel of film, and closes it. The large left drawer 16 is then opened to provide convenient access to the camera 1. The reel is replaced in the camera, the door 16 is closed, and recording can then continue.

When recording is completed, the control unit 5 is turned off, the removable panel 34 is replaced in the aperture 32, and the apparatus is then available for conventional office functions. Simultaneously, the camera, the lights, and the control unit are contained and stored in a protective structure.

In addition to the above-described apparatus, electrostatic or other copying equipment can be mounted in the central and lower right drawers 24 and 26 with suitable mirrors to reflect the image rays to it. The specific structure would be similar to that already illustrated. The second mirror 3 can be pivotally mounted to pivot around a vertical axis and reflect the image rays to the right side of the apparatus or to the left as desired. Alternatively, an additional mirror could be provided which is similar to the second mirror 3. This additional mirror and the illustrated second mirror 3 could be alternatively swung into functional position while the other would be swung out of the way, depending upon whether microfilm recording or photocopying were desired.

The invention disclosed herein can also be adapted to give an external appearance of a conventional table or counter.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A document recording apparatus for recording, by a seated operator, of images of documents, the apparatus comprising:
   a. a desklike support frame having, in a selected position, a front and a rear, and provided with interior walls defining a void opening to the front and extending sufficiently rearwardly to permit unobstructed entry of a seated operator's legs into the void with the front of said frame in contact with the front of said operator;

b. a platform, having an aperture, mounted on the frame with the aperture vertically above the void;

c. a transparent exposure plate extending across said aperture for positioning of documents thereon;

d. illumination means mounted above said void and to the frame below the exposure plate for properly illuminating a document positioned thereon;

e. a camera mounted on the frame to one side of the void; and f. mirror means mounted to the frame outside the void for transmitting the image of the document from the exposure plate along a path outside of the void to the camera;

wherein an operator may, while seated, position documents on the exposure plate and actuate the camera.

2. An apparatus according to claim 1, wherein
 a. a drawer is slidably mounted to the support frame to one side of the void;
 b. the mirror means comprises a first mirror beneath the exposure plate positioned for reflecting the image rays of the document toward the rear of the support frame, and a second mirror near the rear of the void positioned for reflecting the image rays from the first mirror to a position to one side of the void; and
 c. the camera is mounted in said drawer for receipt of the image rays from the second mirror.

3. An apparatus according to claim 2, wherein the mirror means includes:
 a third mirror positioned to said side of the void for reflecting the image rays from the second mirror forwardly to the camera.

4. A document recording apparatus for recording, by a seated operator, of images of documents, the apparatus comprising:
 a. a support frame having, in a selected position, a front and a rear, and provided with a void opening to the front for receiving legs of the seated operator;
 b. a platform, having in a selected position a top and a bottom and having an aperture, mounted on the frame with the aperture above the void;
 c. a transparent exposure plate mounted at the aperture for the positioning of documents thereon;
 d. illumination means mounted to the frame below the exposure plate for properly illuminating a document positioned thereon;
 e. a camera mounted on the frame to one side of the void and near said front;
 f. mirror means mounted to the frame for transmitting the image of the document from the exposure plate along a path avoiding the legs of the seated operator, to the camera; and
 g. a panel removably mounted in the aperture above the exposure plate, the panel having an unobstructed top which is flush with the top of said platform in its unremoved position wherein an operator may, while seated, position documents on the exposure plate and actuate the camera.

5. An apparatus according to claim 4, wherein
 the panel is hinged at its rearmost edge to said platform and has a plurality of control means mounted thereto.

6. An apparatus according to claim 5, wherein
 the control means includes a light intensity indicator and an indicator of the document side being recorded.

7. An apparatus according to claim 4, wherein
 a lifting means is provided for raising the exposure plate to a position substantially flush with the platform by removal of the panel from the aperture, the lifting means comprising:
 a. an exposure plate frame to which the exposure plate is mounted;
 b. resilient means supporting the frame in the aperture and biased to urge the exposure plate to a position flush with the platform;

wherein insertion of the removable panel in the aperture recesses the exposure plate.

8. A document recording apparatus for recording, by a seated operator, of images of documents, the apparatus comprising:
 a. a support frame having, in a selected position, a front and a rear, and provided with a void opening to the front for receiving legs of the seated operator;
 b. a platform, having in a selected position a top and a bottom and having an aperture, mounted on the frame with the aperture above the void;
 c. a transparent exposure plate mounted at the aperture for the positioning of documents thereon;
 d. illumination means mounted to the frame below the exposure plate for properly illuminating a document positioned thereon;
 e. a camera mounted on the frame to one side of the void and near said front;
 f. mirror means mounted to the frame for transmitting the image of the document from the exposure plate along a path avoiding the legs of the seated operator, to the camera; and wherein
 g. the camera is slidably mounted to a drawer which is slidably mounted to the support frame to one side of the void for permitting variable document reduction by sliding of the camera longitudinally along the image ray path and wherein an operator may, while seated, position documents on the exposure plate and actuate the camera.

9. A document recording apparatus for recording, by a seated operator, of images of documents, the apparatus comprising:
 a. a support frame having, in a selected position, a front and a rear, and provided with a void opening to the front for receiving legs of the seated operator;
 b. a platform, having in a selected position a top and a bottom and having an aperture mounted on the frame with the aperture above the void;
 c. a transparent exposure plate mounted at the aperture for the positioning of documents thereon;
 d. illumination means mounted to the frame below the exposure plate for properly illuminating a document positioned thereon;
 e. a camera mounted on the frame to one side of the void and near said front;
 f. mirror means mounted to the frame for transmitting the image of the document from the exposure plate along a path avoiding the legs of the seated operator, to the camera; and
 g. the support frame is an office desk having a top, a knee hole, a center drawer above the knee hole, and at least one side drawer below the top and on each side of the knee hole;
 h. the illumination means is mounted in the center drawer, and;
 i. the camera is mounted in one side drawer and wherein an operator may, while seated, position documents on the exposure plate and actuate the camera.

10. An apparatus according to claim 9, wherein
 an illumination intensity control is mounted in the other top side drawer.

11. A document recording apparatus for recording, by a seated operator, of images of documents, the apparatus comprising:
 a. a support frame having, in a selected position, a front and a rear, and provided with a void opening to the front for receiving legs of the seated operator;
 b. a platform, having in a selected position a top and a bottom and having an aperture, mounted on the frame with the aperture above the void;
 c. a transparent exposure plate mounted at the aperture for the positioning of documents thereon;
 d. illumination means mounted to the frame below the exposure plate for properly illuminating a document positioned thereon;
 e. a camera mounted on the frame to one side of the void and near said front;

f. mirror means mounted to the frame for transmitting the image of the document from the exposure plate along a path avoiding the legs of the seated operator, to the camera; and wherein the mirror means includes:

g. a first mirror beneath the exposure plate positioned for reflecting the image rays of the document toward the rear of the support frame;

h. a second mirror near the rear of the void positioned for reflecting the image rays from the first mirror to a position to one side of the void; and i. a third mirror positioned to said side of the void for reflecting the image rays from the second mirror to the camera; and wherein j. the second mirror is rotatably mounted and rotatable to alternatively reflect the image rays toward a first or a second side of the void;

k. said camera is mounted on the first side of the void;

l. an office copier is mounted on the second side of the void for ultimate receipt of the image rays from said second mirror.

\* \* \* \* \*